July 29, 1958 W. A. CORNELL ET AL 2,845,610

MAGNETIC DATA STORAGE SYSTEM

Filed Aug. 29, 1952 3 Sheets-Sheet 1

INVENTORS W. A. CORNELL
J. H. McGUIGAN
O. J. MURPHY

BY R. O. Covell

ATTORNEY

INVENTORS W. A. CORNELL
J. H. McGUIGAN
O. J. MURPHY
BY R. O. Covell
ATTORNEY

INVENTORS W. A. CORNELL
J. H. Mc GUIGAN
O. J. MURPHY
BY R. O. Covell
ATTORNEY

United States Patent Office 2,845,610
Patented July 29, 1958

2,845,610

MAGNETIC DATA STORAGE SYSTEM

Warren A. Cornell, Murray Hill, and John H. McGuigan, New Providence, N. J., and Orlando J. Murphy, New York, N. Y., assignors to Bell Telephone Laboratories, Incorporated, New York, N. Y., a corporation of New York Application August 29, 1952, Serial No. 307,108

13 Claims. (Cl. 340—174)

This invention relates to pulse amplifiers and more particularly to pulse amplifiers used in conjunction with magnetic recording or storage devices.

An object of this invention is to improve the characteristics, the repetition rate and the selectivity of pulse amplifiers.

A further object of this invention is the elimination of drift in a direct-coupled amplifier.

Another object of this invention is the reduction of the transient energy decay time of a magnetic recording system.

A feature of this invention relates to the use of a transformer for coupling an amplifier to a magnetic head in a magnetic recording system.

A further feature of this invention is the use of input clipping and direct coupling in an amplifier to avoid paralysis of one amplifier as the result of the application thereto of a high-magnitude signal by another amplifier.

Another feature of this invention is the use of a preselected bias on an amplifier to permit that amplifier accurately to discriminate between incoming signals on an amplitude basis.

A further feature of this invention is the use of two "sampling," "control," or "synchronizing" pulses, sequential and non-overlapping in time, to obtain non-interfering operation of two amplifiers.

Magnetic recording or storage systems normally comprise a moving magnetizable surface and one or more magnetic heads positioned in spaced proximity to that surface. Each magnetic head, comprising a coil surrounding a core element, may be used either as a writing or as a reading instrumentality. If a pulse of current of proper amplitude and duration be applied through the coil of the magnetic head, a discrete incremental area of the magnetizable surface will be magnetized, and that magnetization will be retained if the surface is of a material having a suitable magnetic retentivity. Since the pulse may be transmitted in either direction through the coil, it is apparent that any incremental area may be magnetized to represent either of two conditions.

If a magnetized incremental area is moved past a magnetic head, a flux change is induced in the ferromagnetic core of the head whereby a voltage is induced in the coil, the amplitude of that voltage being a function of the rate of change of induced flux in the magnetic core. Thus, the magnetic head can be used selectively to "read" the contents of the incremental area.

Since "writing" current pulses of substantial amplitude must be applied to the coil of the magnetic head, under control of external circuits, and since "reading" pulses derived by the head are of relatively low amplitude, amplifying means must be interposed the head and the "writing" pulse control source and interposed the head and the "reading" pulse output. The amplifying means used in the writing operation must be capable of delivering pulses of sufficient amplitude, of controlled duration, and of selected polarity. The amplifying means used in the reading operation must be capable of delivering output signals of suitable characteristics, must be capable of withstanding the high-amplitude writing pulse with only the briefest paralysis and must, in conjunction with the head, be able accurately to discriminate between two recorded conditions.

The amplifying means herein disclosed is particularly suitable for use in a magnetic-drum recording or computing system. Such systems normally employ a right circular cylinder or drum rotatable at high speed about its longitudinal axis, the surface of the drum being coated or otherwise provided with a layer of magnetizable material. A plurality of magnetic heads are placed in spaced proximity to the revolving surface, the area of the surface which passes under any one of the heads being in the form of an annulus having a width determined by the effective size of the head and having a length equal to the circumference of the drum. Any item of information, which may be represented by one of two conditions, i. e., "yes," "no" or "on," "off," or "X," "O," etc., may be recorded in a relatively small incremental area or cell on the surface of the drum. The minimum area of that cell, and therefore the maximum number of cells for any head, with any given drum and drum speed, is controlled, in part, by the nature of the magnetic head including the so-called transient energy decay time of that head. Means are provided in the disclosed preferred embodiment of the invention for reducing that decay time and for thereby effectively increasing the number of cells which may be dealt with, per unit time, on any given drum.

A further highly advantageous facility of magnetic-drum recorders and computers is that of reading and writing, if desired, on the same pass of the cellular area past a single magnetic head. A system possessing this facility is shown, for example, in the patent application of J. H. McGuigan, O. J. Murphy, and N. D. Newby, Serial No. 201,156, filed December 16, 1950, now Patent No. 2,700,148, granted January 18, 1955. The present amplifying means, in conjunction with a suitable magnetic head, also possesses that facility and is an improvement on the amplifying means disclosed in the above-cited patent application.

The nature of an amplifying means capable of meeting the aforesaid requirements and designed to fulfill the above-noted objects of the invention, may be most clearly perceived from the ensuing description of a preferred embodiment of the invention, when read with reference to the accompanying drawings in which.

Figure 1:
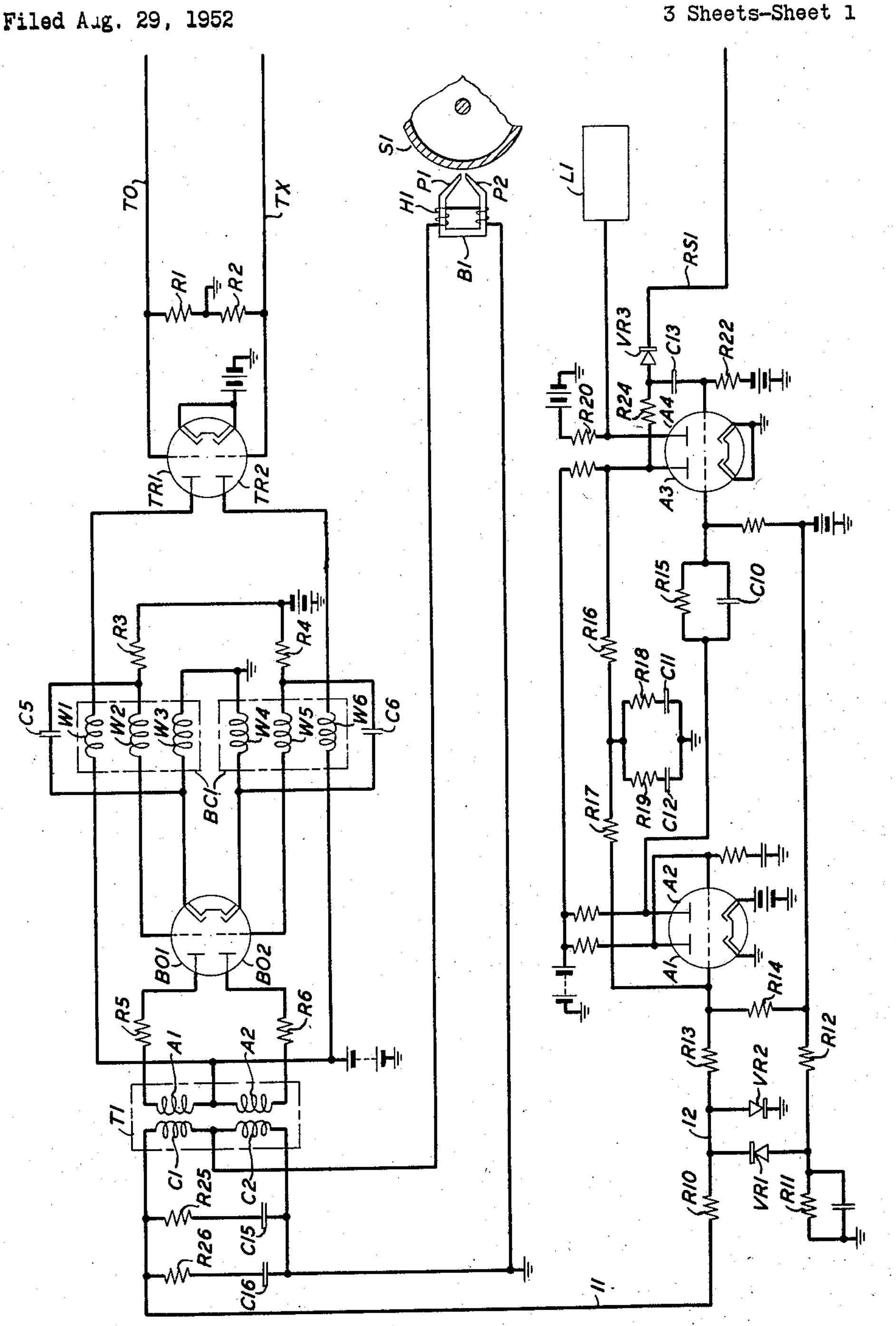
Fig. 1 is a diagrammatic representation of the preferred embodiment of the invention.

In general, the apparatus disclosed in Fig. 1 comprises a magnetizable surface S1, a head H1 suitable for both reading and writing, a writing amplifier, a reading amplifier and a transformer T1 coupling the head H1 to the reading and writing amplifiers. The writing amplifier operates from low-power, high-impedance sources of writing control pulses, and comprises trigger tubes TR1 and TR2, and normally quiescent blocking oscillator circuits including tubes BO1 and BO2. The reading amplifier comprises tubes A1 to A4, a source of "read synchronizing" pulses RS1, and an external output means L1.

Referring now to Fig. 1 of the drawings for a more specific description of the apparatus, the core of the magnetic head H1 has two pointed pole-pieces P1 and P2 which are spaced at their tips to provide an air-gap therebetween. The two pole-pieces P1 and P2 are interconnected by a bridging member B1 and all of these core elements are of laminated ferromagnetic material. The tips of the pole-pieces P1 and P2 are positioned in spaced proximity to a movable magnetizable surface S1. The coils which surround the pole-pieces P1 and P2 are connected in series-aiding relationship, and one of the terminations of this pair of coils is connected to a common ground point on the amplifier chasis while the other terminal is connected to the junction of windings C1 and C2 of transformer T1. Transformer T1 functions both in the reading and writing operations, with winding A1 or A2 serving as the primary winding (depending on whether an "O" or an "X" is to be written) and winding C2 as the secondary winding for the writing operation, and with windings C2 and C1 serving as an autotransformer for voltage step-up transformation for the reading operation.

Figure 2:
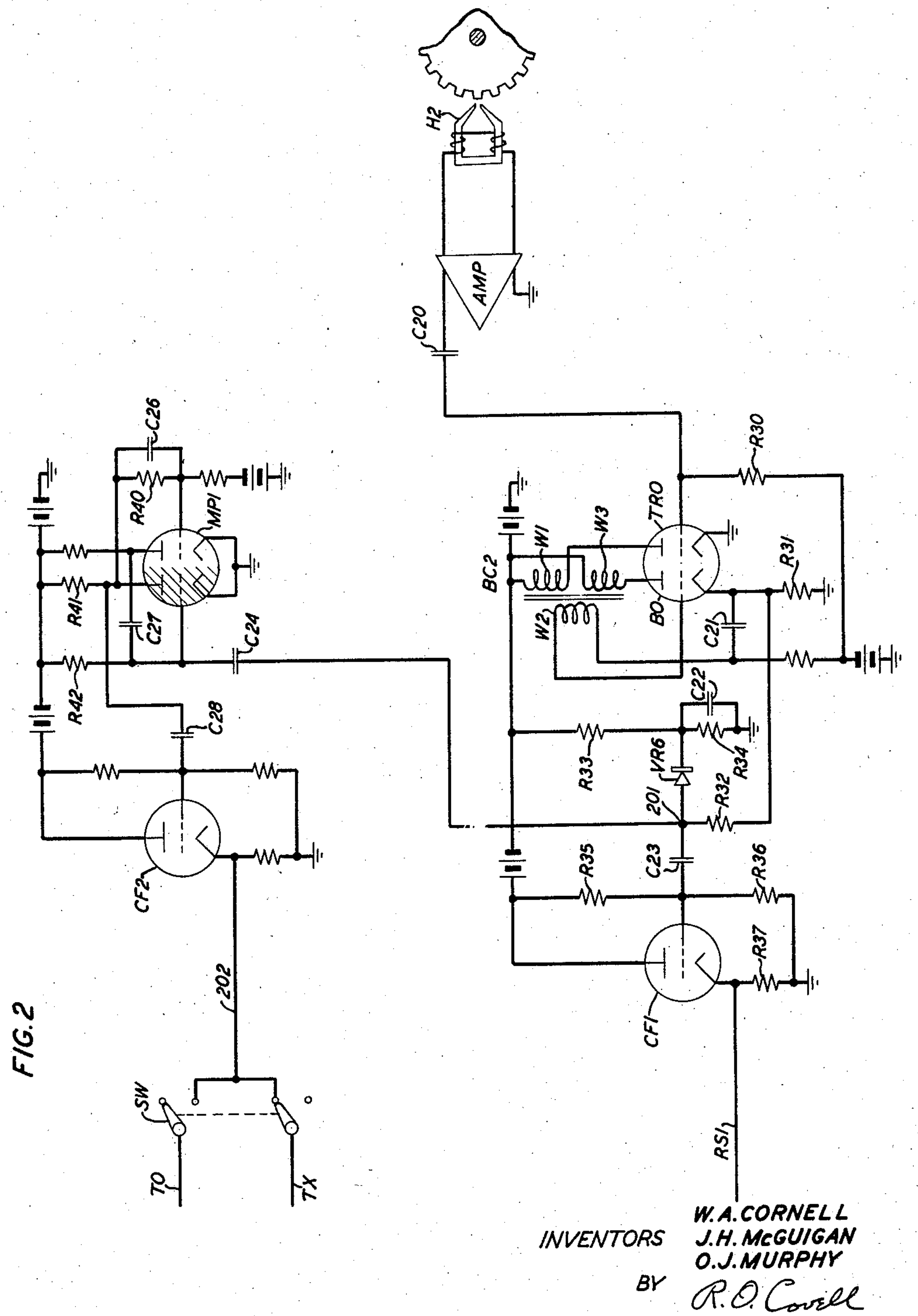
Fig. 2 is a representation of an apparatus for controlling the operation of the circuits of Fig. 1.
Figures 6A, 6B:
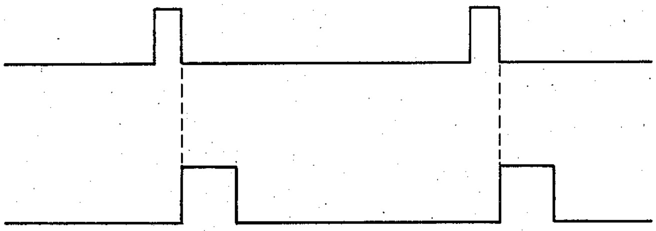

Considering, first, the functioning of the disclosed system during the writing operation, input pulses controlling this operation are received via input conductors TO and TX from an external pulse source such as that disclosed in Fig. 2. A representative series of "write synchronizing" pulses such as may appear on input conductor TO or TX is shown in Fig. 6B. The voltage developed across resistor R1 or R2 as the result of the receipt of a pulse on input conductor TO or TX is applied to the grid of triode TR1 or TR2, respectively, the cathodes of which are connected to a source of positive potential so that tubes TR1 and TR2 are normally biased below cut-off. Incoming pulses, as amplified by tube TR1 or TR2, are applied through winding W1 or W6, respectively, of the blocking oscillator coils BC1, which are connected to a source of positive potential of considerably greater magnitude than that applied to the cathodes of tubes TR1 and TR2.

Tubes BO1 and BO2 constitute, in conjunction with the coils BC1, normally quiescent blocking oscillator circuits. Both tubes BO1 and BO2 are normally biased to cut-off by virtue of the connection of their cathodes to ground through windings W3 and W4, respectively, of coils BC1 and by the connection of a negative potential exceeding grid cut-off to their control grids through windings W2 and W5 and resistors R3 and R4, respectively. When, however, the plate current of tube TR1 or TR2 flows in winding W1 or W6, a sufficiently positive voltage is induced in winding W2 or W5, respectively, to initiate the flow of plate current in the blocking oscillator tube BO1 or BO2, respectively. The plate circuit of tube BO1 may be traced from a grounded source of high positive potential, winding A1 of transformer T1, resistor R5, anode and cathode of tube BO1, winding W3 and to ground; the plate circuit of tube BO2 may be traced from the grounded source of high positive potential, winding A2 of transformer T1, resistor R6, anode and cathode of tube BO2, winding W4 and to ground. As a result of this current in winding W3 or W4, a more positive voltage is induced in winding W2 or W5, thus tending further to increase the plate current in tube BO1 or BO2. This regenerative process results in large voltages being induced in winding W2 or W5 which will drive the corresponding control grids far positive and which, in so doing, will charge capacitor C5 or C6. As saturation current is approached in tube BO1 or BO2, the rate of increase of current with time will diminish, and with it, the induced voltage in winding W2 or W5. When the induced voltage is no longer sufficient to make the plate current increase further, an abrupt reversal of action occurs, the current drops quickly back to zero, and the grid is driven far negative by induced voltage of the opposite sign. During and after this part of the action, capacitor C5 or C6 discharges through resistor R3 or R4 and coil W3 or W4, ultimately restoring the control grid of tube BO1 or BO2 to its initial potential.

As noted, the plate circuit of tube BO1 includes resistor R5 and the plate circuit of tube BO2 includes resistor R6. Resistors R5 and R6 control the amplitude of the output signals and, upon suitable adjustment of the relative values of resistors R5 and R6, the relative strength of the "O" and "X" output pulses. The current through winding A1 or A2, as a result of the operation of blocking oscillator tube BO1 or BO2, induces a voltage in winding C2 of transformer T1, which gives rise to a current which is conducted through the two coils of the magnetic head H1, which are connected series-aiding. The direction of this current depends upon whether the pulse appeared in the primary winding A1 or in the primary winding A2 of transformer T1. Consequently, the polarity of the magnetization of the incremental area of surface S1 varies in accordance with whether an "X" or an "O" is to be recorded.

Figure 3A:
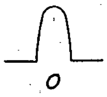
Figs. 3 to 6D represent the voltage or current conditions at certain times and at certain points in the circuits of Fig. 1.
Figure 3B:
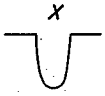

The nature of the current pulse through the windings of the coils of magnetic head H1 is depicted in Fig. 3 of the drawings. It will be seen from Fig. 3A that a pulse representing an "O" is a positive current pulse of high amplitude and limited duration whereas, as shown in Fig. 3B, the pulse representing an "X" is a high amplitude short duration negative current pulse.

Figure 4:
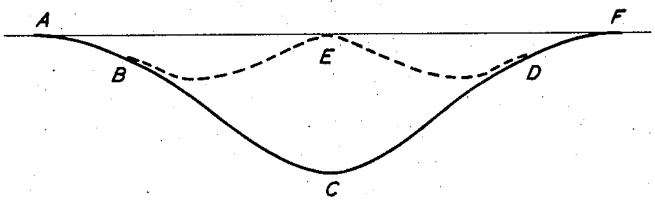

The flux density along the length of an incremental area on the surface S1 is represented in Fig. 4 of the drawings. The surface S1 may be thought of as having been initially subjected to magnetization so that it is at positive magnetic saturation as shown by the straight-line curve A—E—F. The effect of the passage through the coils of magnetic head H1 of a current pulse representing an "X," as represented in Fig. 3B, upon the flux density on the surface S1 is shown by the solid-line curve A—B—C—D—F of Fig. 4, with a point C immediately beneath the recording head reaching negative saturation and with the flux adjacent that point fringing out with reducing density over the incremental area. If, upon a subsequent pass of the incremental area, a current representing an "O," as shown in Fig. 3A of the drawings, passes through the coils of the magnetic head H1, when the incremental area and the pole-tips of the head bear the same geometrical relationship as when the "X" was written, the flux density at a point E immediately under the head will be returned to positive saturation, the areas at the extreme edges of the incremental area will remain at positive saturation, but the intermediate area will retain some of the flux induced as a result of the write "X" operation. Consequently, the flux density after the writing of an "O," following the writing of an "X," may be represented by the dotted-line curve A—B—E—D—F of Fig. 4. There is, however, a substantial difference in the magnitude of the flux as a result of the recordation of an "X" compared to the recordation of an "O" and this difference is adequate to permit accurate discrimination between an "X" and an "O" in the subsequent reading operations, as will be hereinafter described.

It may be noted that since the surface S1 is assumed to pass the magnetic head H1 at a constant speed, the abscissa of the curves of Fig. 4 may be considered to be a temporal as well as a spatial axis.

Figure 5:
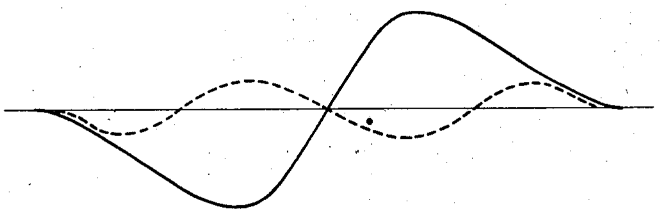

Considering now the functioning of the disclosed system during the reading operation, as a magnetized cell moves past the tip of the magnetic head H1 a magnetic flux will be induced in the pole-pieces P1 and P2 and across the air-gap therebetween. This magnetic flux will cause a voltage to be induced in the windings of the magnetic-head coil, the nature of that voltage being a function of the nature of the magnetization in the incremental area on the surface S1. Thus, referring to Fig. 5 of the drawings, the abscissa of which is drawn to the same time scale as in Fig. 4, the solid-line curve represents the voltage induced in the coils of the magnetic head H1 as the result of the movement of the magnetized area past the magnetic head H1 when the incremental area is magnetized to record an "X," as represented by the solid-line curve of Fig. 4. Similarly, the dotted-line curve of Fig. 5 represents the voltage induced in the coils of head H1 as the result of the movement past that head of an area magnetized to record an "O," as represented by the dotted-line curve of Fig. 4. Since the induced voltage in the coils of head H1 is a function of the time rate of change in the flux induced in the pole-pieces P1 and P2, the curves of Fig. 5 are essentially derivatives of the curves of Fig. 4.

These voltages induced in the coils of head H1 appear across winding C2 of transformer T1. Windings C1 and C2 of transformer T1 serve as an autotransformer, with winding C1 having, in the preferred embodiment of the invention, about twice as many turns as winding C2. Consequently, the voltage appearing between the grounded terminal of winding C2 and the upper terminal of winding C1 is about three times the voltage appearing across winding C2 alone. The voltage appearing across windings C1 and C2 of transformer T1 is applied, via conductor 11, to the input of the reading amplifier comprising tubes A1 to A4.

The peak-to-peak voltage appearing on conductor 11 as the result of the reading of a recorded "X," i. e., the maximum excursion of the voltage represented by the solid-line curve of Fig. 5, may be, for example, approximately 0.1 volt, while the maximum excursion of the "O" or dotted-line curve of Fig. 5 may be in the range of 0.01 to 0.03 volt. To provide the requisite output signal with these input signals, the gain of the reading amplifier must be relatively great. However, means must be provided to prevent overloading of the amplifier as a result of the application of higher voltages to conductor 11 during the writing process. During the previously-described writing operation, a voltage of substantial amplitude was induced in winding C2 of transformer T1 to energize the coils of magnetic head H1. Since windings C1 and C2 of transformer T1 act as an autotransformer at this time also, a voltage much larger than the aforesaid reading voltage is applied to conductor 11 during the writing operation.

Varistors VR1 and VR2, which are unidirectional current conducting device, serve, in conjunction with resistor R10, as a means for limiting the incoming signals. Varistor VR1 is connected between conductor 12 and a point on the voltage divider comprising ground, resistors R11 and R12 and negative bias battery, so that the lower electrode of varistor VR1 is held at an approximately negative 2-volt potential. Varistor VR2 is connected between conductor 12 and ground. Each of the varistors VR1 and VR2, as all other varistors on the drawings, presents a low impedance to conventional current when the arrow side thereof is positive relative to the other side, and a high impedance to conventional current when the arrow side is negative relative to the other side. It will be seen, therefore, that the voltage on conductor 12 can not become much more negative than a negative 2 volts due to the action of varistor VR1 and can not become much more positive than ground potential due to the action of varistor VR2. The parameters of the plural direct-current paths from conductor 12 to sources of potential are so selected that the direct potential on conductor 12 is normally approximately 1 volt negative with respect to ground. The low amplitude reading pulses will not be affected by the action of this limiting means but the high amplitude pulses resulting from the writing operation will be limited to a total excursion of approximately two volts, about a negative 1-volt axis.

The signal voltage on conductor 12, which in the case of a reading operation, is of a form similar to that represented in Fig. 5, is applied through isolating resistor R13 to the grid of triode A1. The biasing voltage on tube A1 is established by the connection of resistor R14 to negative bias battery and by a feedback connection hereinafter to be described. Tube A1 is directly coupled to triode A2, the cathode of which is held at a positive bias potential. The output of amplifier A2 is applied through a coupling network comprising resistor R15 and capacitor C10, in parallel, to the grid of triode A3. While it is desirable to use a direct-coupled amplifier in view of the overloading that occurs at the receipt of the limited write pulse, the aforesaid coupling network substantially improves the high frequency response of the amplifier. The parameters are so selected that the time required for capacitor C10 to discharge through resistor R15 after overloading occurs is so short—in the order of a microsecond or so—that this type of coupling may be satisfactorily employed.

The output of tube A3 is applied both to an output circuit and to a feedback loop. With the particular magnetic surface speeds, pulsing and amplifying arrangements employed, it was found that most of the energy in the pulses applied to the input of the reading amplifier was in the frequency range of 5 kilocycles to 200 to 300 kilocycles per second, although this is a function of the size of the incremental area, the speed of movement of the incremental area past the pole-pieces P1 and P2, and other factors. In this frequency range, high gain amplification is required. However, since the signal to be amplified by the reading amplifier has no direct-current component, no direct-current amplification is required. Therefore, a degenerative feedback circuit may be employed which reduces the over-all gain of the amplifier very little at the upper range of frequencies, but which is effective to reduce the gain to only a few decibels as the frequency approaches zero. By providing very little amplifier gain for direct currents, the output drift which is frequently a characteristic of direct-coupled amplifiers is largely avoided, and the operating point of tube A3 remains substantially constant.

Since tube A3 is the third stage of amplification, the signal at its anode is of a phase opposite to that of the input signal and negative feedback may, therefore, be obtained by connecting the anode of tube A3 to the control grid of tube A1 through resistors R16 and R17. The parameters of the grounded network comprising resistors R18 and R19 and capacitors C11 and C12 are selected so as to introduce substantially no loss in the feedback loop at low frequencies, e. g., 5 to 10 cycles per second, and progressively to introduce more loss in the feedback loop up to a higher frequency, e. g., 1500 to 2000 cycles per second. This value is determined mainly by one pair of elements—say resistor R18 and capacitor C11. With the experimentally employed parameters, the over-all gain of the amplifier increased between 6 cycles per second and 1600 cycles per second by a factor of about 270. The gain of the amplifier for frequencies above 1500 to 2000 cycles per second is relatively constant until frequencies of the order of 100,000 cycles per second are reached. In this region elements R19 and C12 come into play and introduce a little more loss into the feedback path to counteract the tendency of the gain to fall off as frequency increases. At frequencies well above 100,000 cycles per second, the gain of the amplifier falls off at a substantial rate.

The output of tube A3 is also applied via resistor R24 and capacitor C13 to the grid of triode A4, the cathode of which is grounded and the anode of which is connected through load resistor R20 to a source of positive potential. Tube A4 is effective to transmit an output indication, however, only under certain conditions: The input pulse to it must exceed a certain amplitude and a positive-going "read-synchronizing" pulse must be received over conductor RS1.

As previously indicated, the read-write amplifier is capable of reading the contents of an incremental area and, if desired, writing into that area on the same pass of the area past the head H1. As also previously discussed, a pulse is applied to the input of the reading amplifier as a result of the writing operation. Therefore, means must be provided to insure that a writing pulse will not cause an output indication to be transmitted by the reading amplifier. Such means must be effective immediately upon the completion of the reading operation to prevent maloperation as a result of the closely succeeding writing pulse. This means comprises a varistor VR3, one terminal of which is connected to the junction of resistor R24 and capacitor C13 and the other terminal of which is connected via conductor RS1 to an external "read-synchronizing" pulse source such as that shown in Fig. 2 of the drawings. The read-synchronizing pulses should bear a time relationship to the "write-synchronizing" pulses applied to input conductors TO and TX. Thus, each of the read-synchronizing pulses, a representative series of which is shown in Fig. 6A, may immediately precede a write-synchronizing pulse, a representative series of which is shown in Fig. 6B. A suitable source of pulses bearing the requisite relationship is shown in Fig. 2, hereinafter to be described.

Under the static conditions, the anode of tube A3 is at a potential of about 100 volts positive. With the application to the grid of tube A3 of a previously amplified negative-going signal, the anode voltage will rise to a more positive value, becoming slightly more positive, to 105 to 110 volts positive for example, if the input signal to the reading amplifier results from the reading of an "O," becoming substantially more positive, to 130 to 140 volts or more positive for example, if the input signal to the reading amplifier results from the reading of an "X," and becoming even more positive, to nearly 150 volts positive for example, if the input signal is the result of a writing operation. This rise in potential of the anode of tube A3 is applied through resistor R24 to one terminal of varistor VR3. If varistor VR3 presents a low impedance to this signal, substantially no signal will be applied to the grid of tube A4; if however, varistor VR3 presents a high impedance to this signal, the signal is applied with little attenuation through capacitor C13 to the grid of tube A4.

The impedance conditions of varistor VR3 are controlled by the presence or absence of the "read-synchronizing" pulse on conductor RS1, which pulse is a substantially square wave pulse having, for example, a 50-volt amplitude above a 100-volt reference line. Thus, when the reading amplifier is in its normal quiescent condition, both terminals of varistor VR3 are at a potential of about 100 volts positive. If the anode potential of tube A3 rises as the result of the receipt of a signal, varistor VR3 will present a low impedance path and substantially no pulse will be applied to tube A4. If, however, at any time that the anode of tube A3 is at such high potential, the potential at the right-hand electrode of varistor VR3 temporarily rises to 150 volts as a result of the receipt of the "read-synchronizing" pulse, varistor VR3 will present a high impedance to the less-than-150-volt signal at the anode of tube A3 and a signal will thereby be applied to the grid of tube A4. As may be seen from the representation of Fig. 6A, the read-synchronizing pulse occurs and terminates prior to the appearance of a write-synchronizing pulse as represented in Fig. 6B, and a write-synchronizing pulse terminates a substantial interval before any succeeding read-synchronizing pulse is received. Therefore, since no read-synchronizing pulse will be received for a substantial period after writing occurs, any rise in anode potential of tube A3 which results from the writing operation will have some time to die away and hence will not be communicated to tube A4 whereby the erroneous transmission of a read output signal as the result of the writing operation is positively prevented.

During the limited period during which a read-synchronizing pulse is being received, a positive-going pulse will be applied to the grid of output tube A4. This pulse may be indicative either of the reading of an "O" or of the reading of an "X." As above noted, in the former case this pulse will have a maximum amplitude of somewhat less than a predetermined voltage and in the latter case it will have a minimum amplitude somewhat greater than that predetermined voltage. To permit the circuits to discriminate between these two conditions, a threshold biasing potential is applied to tube A4 through resistor R22. Obviously, this voltage should be negative relative to ground by an amount approximately equal to the difference between the threshold value for the particular tube and circuit conditions and the aforesaid predetermined voltage. Thus, as an example, if the threshold value for tube A4 under a particular set of plate circuit conditions be a negative 6 volts and if the predetermined voltage, above which a signal derived from the reading of an "X" always goes and above which a signal derived from the reading of an "O" never goes, be 20 volts positive, then the voltage to be applied through resistor R22 should be approximately a negative 26 volts. With the proper threshold bias established, no output signal will be transmitted from tube A4 if an "O" is read, but a negative-going pulse will be transmitted if an "X" is read. This negative-going pulse is applied to the external load circuit represented by the rectangle L1.

It will be recalled that a voltage appears between the grounded terminal of coil C2 and the upper terminal of coil C1 of transformer T1 both when a reading and when a writing operation are being performed. It has further been demonstrated that the existence of such a voltage due to writing can not cause an output indication improperly to be transmitted from the reading amplifier at the instant of its occurrence. However, the effects of this voltage must have substantially entirely terminated prior to the next reading operation if malfunctioning is to be avoided, and this controls, in part, the minimum spacing in time between the magnetizable incremental areas and, therefore, the maximum amount of information which may be stored on surface S1 for a given surface speed.

Thus, referring to Fig. 6A of the drawings, there is shown a representation of a series of read-synchronizing pulses spaced one cell length apart although it is to be understood that these pulses do not define either the beginning, end or center of a cell but actually occur at a time when somewhat less than half of the cell length has passed under the magnetic head H1. Fig. 6B shows a series of write-synchronizing pulses which do not appear until after the corresponding read-synchronizing pulses have ended. These write-synchronizing pulses occur at a point in time when the center of a cell is approximately under the magnetic head H1.

Figure 6C:
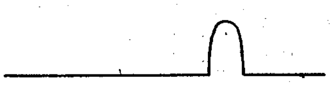
Figure 6D:
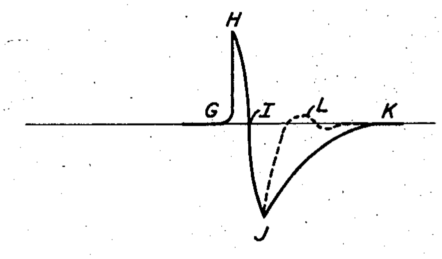

The actual pulse of current which appears in winding A1 or A2 of transformer T1 and in the coil of the magnetic head H1 as a result of the operation of one of the blocking oscillator tubes BO1 or BO2 may be represented as in Fig. 6C, where the amplitude of the pulse is substantial, being as much as one-third of an ampere. If the coils of the magnetic head H1 be connected directly to the anodes of the blocking oscillator tubes BO1 and BO2, as in the above-identified application of J. H. McGuigan, O. J. Murphy and N. D. Newby, the voltage across the coils of the magnetic head H1 alone due to the passage of the current pulse shown in Fig. 6C may be represented by the solid-line curve G—H—I—J—K of Fig. 6D. It will be noted that the slope of the portion of the curve from J to K, representing transient energy decay, is of reduced slope due, primarily, to eddy currents in the head. Substantial time is required for that energy to be sufficiently dissipated so as not to mask, or render ambiguous, the reading of the next incremental area, i. e., the spacing between the incremental areas must be relatively great. This curve of voltage representing the transient energy decay may be shifted, however, to the dotted-line representation of Fig. 6D, i. e., to the curve G—H—I—J—L—K, through the use of a transformer T1 and one or more networks shunting windings C1 and C2 of that transformer, such as the network comprising serially-connected resistor R25 and capacitor C15 and the network comprising serially-connected resistor R26 and capacitor C16, as shown on Fig. 1 of the drawings. The relationship between the magnetic head H1, the transformer T1 and the aforesaid networks is such that during the initial positive portion of the cycle, from G to I, energy is stored in transformer T1 and in capacitors C15 and C16, as well as in the core and windings of head H1. The decay of this energy in the transformer and networks produces a voltage which opposes the voltage produced by the decay of energy in the head H1, thereby reducing the amplitude of the curve from J to K. The use of additional resistance-capacitance networks of various time constants in parallel with the two networks shown will further reduce the duration of the writing transient and permit even closer spacing of the incremental areas on the surface S1 and, therefore, an even larger number of incremental areas for a given total area of surface S1 moving at a given linear speed.

Fig. 2, which should be placed to the right of Fig. 1, discloses a means for producing a series of "read-synchronizing" pulses and a series of "write-synchronizing" pulses of suitable amplitude and duration and of suitable time relationship one to the other. The apparatus of Fig. 2 may be energized by any suitable source of constantly spaced pulses, for example these pulses may be derived from the rotating drum itself. Thus, a portion of the drum, as represented in Fig. 2, may be serrated and a magnetic head H2 may be placed in spaced proximity to that serrated portion. In the manner fully set forth in the above-cited application of McGuigan et al., in which head H2 may find its equivalent in McGuigan et al.'s head 50 and in which amplifier AMP may find its equivalent in McGuigan et al.'s amplifier 60, a series of suitably spaced pulses are transmitted from amplifier AMP and applied through capacitor C20 to the grid of trigger tube TRO. When the input signal applied to the grid of tube TRO becomes sufficiently positive to overcome the negative bias applied thereto through resistor R30, an increasing current will flow through winding W1, included in the plate circuit of tube TRO.

Tube BO constitutes, in combination with the coils BC2, a normally quiescent blocking oscillator circuit and tube BO is normally biased to cutoff. When, however, the plate current of tube TRO flows in winding W1, a positive voltage is induced in winding W2 of coils BC2 and this positive voltage is applied to the control grid of tube BO, thereby initiating a flow of plate current in the blocking oscillator tube BO. Since the plate circuit of tube BO includes winding W3 of the blocking oscillator coils BC2, the flow of plate current through winding W3 will induce a more positive voltage in winding W2, thus tending further to increase the plate current in tube BO. This regenerative process results in large voltages being induced in winding W2 which will drive the control grid of tube BO far positive and which, in so doing, will charge capacitor C21. As saturation current in tube BO is approached, the rate of increase of current with time will diminish, and with it, the induced voltage in winding W2. When the induced voltage is no longer sufficient to make the plate current increase further, an abrupt reversal of action occurs, the current drops quickly back to zero, and the control grid of tube BO is driven far negative by induced voltage of the opposite sign. During and after this portion of the action, capacitor C21 discharges, thereby restoring the control grid of tube BO to its initial potential. This surge of plate current in tube BO will produce a corresponding change in the potential drop across load resistor R31 so that the potential applied through resistor R32 to point 201 will tend to rise from ground potential to a positive value and then return to ground potential. However, the peak value which may be reached at point 201 is limited by means of varistor VR6 which is connected to a point on the potential divider comprising resistors R33 and R34, the latter of which is shunted by capacitor C22. Thus, varistor VR6 and its associated elements serve an amplitude-limiting and pulse-shaping function.

Cathode follower tube CF1 is normally biased by means of voltage divider resistors R35 and R36 and the load resistor R37 to a point where it is conducting. Due to the potential drop across load resistor R37 a positive potential of substantial amplitude is normally applied to output conductor RS1. When point 201 rises in potential due to the previously described blocking oscillator action, this rise in potential will be applied through capacitor C23 to the control grid of tube CF1, driving that grid to a higher value of potential, increasing the plate current in tube CF1, increasing the potential drop across the load resistor R37 and thereby causing an increased potential to be applied to output conductor RS1. When the potential at point 201 falls in value the conduction in tube CF1 will be reduced whereby the output potential on conductor RS1 will restore to its initial value. In this fashion a positive-going pulse is applied to conductor RS1 at each operation of the blocking oscillator circuit comprising tube BO. The output pulses on conductor RS1 are somewhat ideally represented in Fig. 6A of the drawings.

Concurrently with the above-described operation of cathode follower CF1, the rise in potential at point 201 is applied through capacitor C24 to the control grid of the left-hand section of tube MP1. Tube MP1 comprises that which may logically be labeled a "monopulser," and is a conventional form of the so-called "single shot multivibrator," i. e., it is a device, which when triggered, will complete one cycle of operation. The monopulser comprising tube MP1 is so biased that normally the left-hand section is conducting and the right-hand section is below cutoff. Upon the application of the leading edge of the positive-going pulse through capacitor C24 to the control grid of the left-hand section of tube MP1, capacitor C24 will charge but no change of state will occur since that section is already at grid conduction. However, at the trailing edge of that pulse, the control grid of the left-hand section of tube MP1 will be driven to a negative potential, cutting off conduction in the left-hand section of tube MP1. Due to the action of the cross-coupling networks comprising resistor R40 and capacitor C26, and capacitor C27, a potential will be applied to the control grid of the right-hand section of tube MP1 which will cause that section to become conductive. After a period of time determined primarily by the time constant of the network elements capacitor C27 and resistor R42, tube MP1 will restore to its initial condition wherein the left-hand section is conducting and the right-hand section is cut off.

As a result of this cycle of operations and due to the potential drop across load resistor R41, a positive-going essentially square wave pulse will be applied from the anode of the left-hand section of tube MP1 through capacitor C28 to the control grid of cathode follower CF2, the nature and operation of which is identical to that of cathode follower CF1, as hereinbefore described. Consequently, a positive-going square wave pulse will be applied to conductor 202 in response to each operation of the blocking oscillator comprising tube BO. Since the pulse on output conductor RS1 is produced as a result of a rise in potential at point 201 and since the output pulse on conductor 202 is produced as a result of a fall in potential at point 201, each pulse on conductor 202 will immediately follow, in point of time, but not overlap the corresponding pulse on conductor RS1. The output pulses on conductor 202 are somewhat ideally represented in Fig. 6B of the drawings and dotted lines are drawn between Figs. 6A and 6B to emphasize the time relationship between the pulses on conductor 202 and on conductor RS1.

The pulses on conductor 202 may be selectively applied either to conductor TO or to conductor TX depending upon the "control" which in this instance is the position of switch SW. The pulses on conductor RS1 constitute the "read-synchronizing" pulses and the pulses on conductor TO or TX constitute the "write-synchronizing" pulses, and these several pulses are employed to actuate the read-write amplifier of Fig. 1 in the manner hereinbefore described.

It is to be understood that the above-described arrangements are but illustrative of the application of the principles of the invention. Numerous other arrangements may be devised by those skilled in the art without departing from the spirit and scope of the invention.

What is claimed is:

1. In a signal storage device, a magnetic head, an amplifier, a transformer for coupling said head to said amplifier, means for reducing the transient energy decay time of said head, said means comprising said transformer and a resistance-capacitance network connected to said transformer.

2. In a signal storage device, a magnetic head, an amplifier, a transformer for coupling said head to said amplifier, means for applying a pulse to said head, means including said transformer and a resistance-capacitance network connected to said transformer for storing energy while said pulse is being applied to said head, and means for transferring the stored energy to said head at the termination of said pulse.

3. In a signal storage device, a transformer having a primary winding and a secondary winding, an amplifier connected to said primary winding, a magnetic head connected to said secondary winding, and a resistance-capacitance network connected in parallel with said secondary winding.

4. In a signal storage device, a transformer having a primary winding and a first and a second secondary winding, an amplifier connected to said primary winding, a magnetic head connected to said first secondary winding, and a resistance-capacitance network connected across both of said secondary windings.

5. In a signal storage device, a magnetic head, a first amplifier, a second amplifier, a transformer for coupling said head to said first and to said second amplifiers, and means comprising said transformer and a resistance-capacitance network connected to said transformer for reducing the transient energy decay time of said head.

6. In a signal storage device, a transformer having a first, a second, and a third winding, said second and said third windings being interconnected, a first amplifier connected to said first winding, a magnetic head connected across said second winding, a second amplifier connected across said second and said third windings, and energy storage means associated with said transformer for reducing the transient energy decay time of said head.

7. In a signal storage device, a transformer having a first, a second, and a third winding, said second and said third windings being interconnected, a first amplifier connected to said first winding, a magnetic head connected across said second winding, a second amplifier connected across said second and said third windings, and a resistance-capacitance network connected across said second and said third windings.

8. In a signal storage device, a magnetic head, a magnetizable surface movable relative to said head, a direct-coupled reading amplifier, a source of high amplitude pulses, means including a transformer for coupling said source to said head and to said amplifier, and unidirectional current means connected to said transformer and to said amplifier for limiting the amplitude of the pulses applied to said amplifier.

9. In a signal storage system, a magnetic head, a magnetizable surface movable relative to said head, a first pulse source, a writing amplifier connected to and controlled by said first pulse source, a reading amplifier, means coupling said magnetic head to said writing amplifier and to said reading amplifier whereby said head is utilized in both reading and writing operations of said system, a second pulse source connected to and controlling said reading amplifier and means for synchronizing said first and said second pulse sources whereby said reading amplifier is inoperative during the operation of said writing amplifier.

10. In a signal storage system, a magnetic head, a magnetizable surface movable relative to said head, a first pulse source, a writing amplifier connected to and controlled by said first pulse source, a reading amplifier, means coupling said magnetic head to said writing amplifier and to said reading amplifier whereby said head is utilized in both reading and writing operations of said system, and a second pulse source connected to and controlling said reading amplifier, said second pulse source also connected to and controlling said first pulse source whereby said writing amplifier is enabled only during a portion of each interval that said reading amplifier is disabled.

11. In a signal storage system, a magnetic head, a magnetizable surface movable relative to said head, a writing amplifier, a reading amplifier, apparatus coupling said magnetic head to both of said amplifiers whereby said head is utilized in both reading and writing operations of said system, a source of write-synchronizing pulses connected to said writing amplifier, a source of read-synchronizing pulses connected to said reading amplifier, and means connected to both of said sources for controlling the relative times of operation of said sources whereby said writing amplifier is inoperative during the operation of said reading amplifier and said reading amplifier is inoperative during the operation of said writing amplifier.

12. In a signal storage system, a magnetic head, a magnetizable surface movable relative to said head, a writing amplifier, a reading amplifier, apparatus coupling said magnetic head to both of said amplifiers, a source of control pulses, each of said control pulses having a leading and a trailing edge, a source of read-synchronizing pulses connected to said reading amplifier and to said source of control pulses and actauted by the leading edge of each of said control pulses, and a source of write-synchronizing pulses connected to said writing amplifier and to said source of control pulses and actuated by the trailing edge of each of said control pulses.

13. In a signal storage system, a magnetic head, a magnetizable surface movable relative to said head, a writing amplifier, a reading amplifier, apparatus coupling said magnetic head to both of said amplifiers, a normally quiescent blocking oscillator for generating a pulse, means connected to said oscillator for energizing said oscillator, means connected to said reading amplifier and to said oscillator for applying a pulse generated by said oscillator to said reading amplifier, means connected to said oscillator for producing a synchronizing pulse following the pulse generated by said oscillator, and means connected to said writing amplifier for applying said synchronizing pulse to said writing amplifier.

References Cited in the file of this patent

UNITED STATES PATENTS

| | | |
|---|---|---|
| 2,133,418 | Blau et al. | Oct. 18, 1938 |
| 2,153,202 | Nichols | Apr. 4, 1939 |
| 2,272,235 | Boucke | Feb. 10, 1942 |
| 2,368,454 | Dome | Jan. 30, 1945 |
| 2,378,388 | Begun | June 19, 1945 |
| 2,400,796 | Watts et al. | May 21, 1946 |
| 2,419,548 | Grieg | Apr. 29, 1947 |

(Other references on following page)

UNITED STATES PATENTS

| | | |
|---|---|---|
| 2,540,654 | Cohen | Feb. 6, 1951 |
| 2,587,532 | Schmidt | Feb. 26, 1952 |
| 2,641,749 | Lawrence | June 9, 1953 |
| 2,679,551 | Newby | May 25, 1954 |
| 2,700,148 | McGuigan et al. | Jan. 18, 1955 |
| 2,734,186 | Williams | Feb. 7, 1956 |

OTHER REFERENCES

Publication, Proc. Institute Electrical Engin., 340-174.1, pp. 94–106, April 1952.

Bood: High Speed Computing Devices, McGraw-Hill Book Co., 1950, pp. 40–42. (Copy in Div. 42.)